United States Patent
Cheers

[15] 3,671,057
[45] June 20, 1972

[54] VEHICLE SUSPENSION
[72] Inventor: Ronald M. Cheers, Mentor, Ohio
[73] Assignee: Euclid, Inc., Cleveland, Ohio
[22] Filed: July 6, 1970
[21] Appl. No.: 52,243

[52] U.S. Cl. ............................................280/124 R, 267/63
[51] Int. Cl. ..........................................................B60g 9/00
[58] Field of Search ..................267/21, 21 A, 63; 280/124 R

[56] References Cited

UNITED STATES PATENTS

| | | | |
|---|---|---|---|
| 3,480,268 | 11/1969 | Fishbaugh | 267/63 X |
| 3,537,696 | 11/1970 | Webster | 267/63 |
| 2,486,741 | 11/1949 | Gabriel | 267/63 |
| 3,434,708 | 3/1969 | Hawk | 267/63 |

Primary Examiner—Philip Goodman
Attorney—Watts, Hoffman, Fisher & Heinke

[57] ABSTRACT

A vehicle suspension is disclosed in which the vehicle frame is suspended on driven vehicle wheel assemblies. The new suspension includes a radius arm connected between an axle housing and the vehicle frame. A suspension spring unit is also connected between the axle housing and the frame.

The suspension spring unit includes a piston member connected to the axle housing and a housing defined by the frame for receiving the piston. The piston member is resiliently supported against vertically upward movement relative to the frame as well as against lateral and longitudinal movement relative to the frame.

13 Claims, 5 Drawing Figures

INVENTOR.
RONALD M. CHEERS
BY Watts, Hoffmann,
Fisher & Heinke
ATTORNEYS.

VEHICLE SUSPENSION

BACKGROUND OF THE INVENTION

1. Field of the Invention

The present invention relates to vehicle suspension systems and more particularly relates to suspension systems employing elastomeric materials to support a vehicle frame on a wheel assembly or structure associated with the wheel assembly.

Suspensions associated with wheel assemblies of land vehicles apply the vehicle weight to its ground engaging wheels. The suspensions normally include a spring unit connected between a wheel assembly and the vehicle frame. Such spring units must be capable of supporting the weight of the vehicle as well as cushioning and reacting against vertical forces which tend to be transmitted to the frame from the vehicle wheels as the wheels encounter rugged terrain. Suspensions should additionally be capable of cushioning horizontal forces acting both longitudinally of the vehicle frame and transversely, or laterally, of the frame.

Lateral forces are produced when one wheel tends to move vertically relative to the frame and other vehicle wheels. Whenever an individual wheel assembly of the vehicle encounters a bump or a depression in the terrain, the wheel assembly tends to move in a vertical direction with respect to the frame and another wheel assembly on the axle. This results in transmission of a vertical force between the wheel assembly and the frame through the suspension. A horizontal force, due to axle foreshortening, is also produced which has a line of action extending transversely of the vehicle frame. This transverse, or lateral, force is transmitted to the frame by the suspension system, preferably through some sort of cushioning device so that a reaction force is created while shock loadings are minimized.

Whenever the wheel assemblies are braked, the brakes retard rotation of the vehicle wheels relative to the frame and torsional forces are applied to nonrotating elements of the wheel assemblies, such as axle housings. The torsional force is transmitted through the suspension to the frame on a line of action extending longitudinally of the vehicle.

2. The Prior Art

Prior art vehicle suspension systems employing resilient elastomeric spring units between wheel assemblies and a vehicle frame frequently included a number of spaced elastomeric spring members. These spring members were frequently interconnected by relatively complex structures. In some prior art constructions, elastomeric springs were required to resist substantial shearing forces as well as compressive forces and such combinations of applied forces tended to rapidly destroy the resiliency of the springs. Such suspensions were of complex construction, costly, difficult to service and lacked durability.

The prior art has also proposed connecting plate-like members to axle housings so that each plate projected into a chamber is supported by the vehicle frame. The plate was surrounded by an elastomeric pad contained in the chamber. These proposals were not entirely satisfactory because the rubber pad tended to extrude on compression resulting in the plate-like members cutting the pad material. Furthermore, the plate members tended to cut, tear and/or abrade the rubber pads when vertical and horizontal forces were transmitted to the vehicle frame through the pad surrounding the plate member. Hence, these proposals did not provide durable suspensions.

SUMMARY OF THE INVENTION

The present invention provides a new and improved vehicle suspension including a suspension spring unit which includes elastomeric, resilient members for transmitting vertical and horizontal forces between a wheel assembly and a vehicle frame while cushioning vibrations and shocks. The new spring unit is of simple construction, yet assures against shearing, abrading and cutting of the elastomeric members.

The new suspension spring unit comprises a piston and housing arrangement in which vertical and horizontal forces are transmitted between the wheel assemblies and frame through elastomeric springs.

In the preferred embodiment of the invention, a tubular housing is formed by the vehicle frame. The housing supports an internal sleeve structure which is fixed against movement axially of the housing. A piston carried by an axle housing extends into the housing and sleeve structure. The sleeve closely surrounds the piston.

A compressible, resilient spring material is confined between the piston head, the sleeve structure and an end wall of the housing so that vertical loads and shock forces applied to the wheel assembly are transmitted through the confined spring material.

The sleeve construction includes a plurality of sleeve members each of which extends parallel to an adjacent wall portion of the housing. Elastomeric spring members are interposed between each sleeve member and the associated housing wall portion. Each sleeve member is constrained for movement toward and away from the associated housing wall portion to compress and relax an interposed sleeve spring member. Each sleeve member is movable independently of the other sleeve members so that the sleeve springs are not subject to shearing forces or abrasive contact with the sleeve members and housing wall.

The piston member is connected to a piston rod by a universal connection so that cocking of the piston in the sleeve is avoided. Accordingly horizontal forces transmitted by the piston to the housing and vehicle frame are applied substantially uniformly along a given sleeve member by the piston. Moreover, the compressive forces applied to the sleeve springs by the sleeve plates and housing walls are distributed over the spring area so that unit pressure forces acting on the springs are minimized. This insures against cutting the spring members.

A principal object of the present invention is the provision of a new and improved suspension spring unit for a vehicle in which elastomeric spring members transmit forces and shock loads between a vehicle wheel and frame in compression and in which the elastomeric spring elements are not subjected to shearing, cutting and/or abrading by associated parts of the suspension.

Other objects and advantages of the invention will become apparent from the following description thereof made with reference to the accompanying drawings which form a part of the specification.

DESCRIPTION OF A PREFERRED EMBODIMENT

Figure 1:
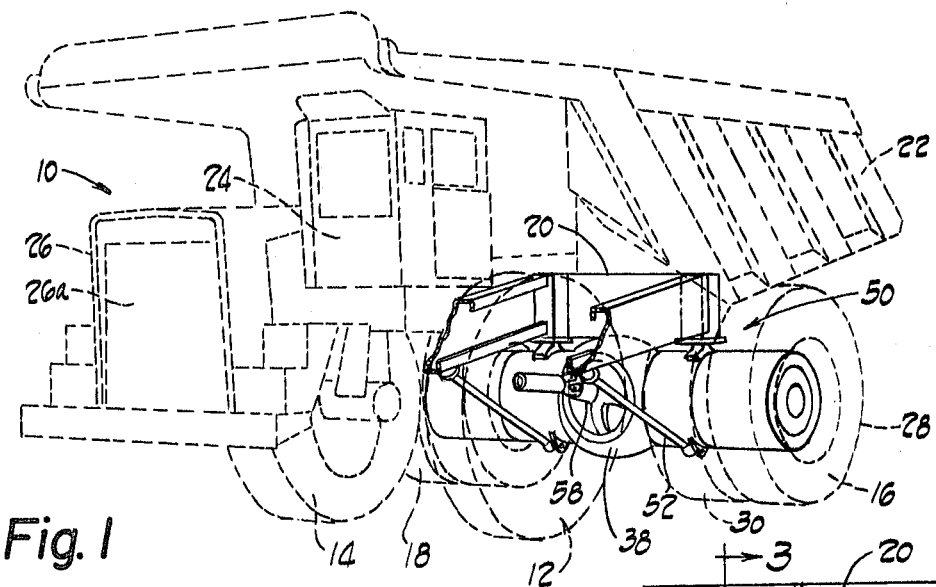
FIG. 1 is a perspective view of a vehicle embodying the present invention having portions shown in broken lines.

A vehicle 10, in the form of a rear dumping truck, embodying the present invention is shown in FIG. 1. The truck 10 includes front ground engaging steerable wheel assemblies 12, 14 and two rear driving wheel assemblies 16, 18. The front and rear wheel assemblies support a frame 20. The frame 20 supports a dump body 22, an operator's cab 24, and an engine compartment 26 surrounding a suitable engine 26a. The dump body, cab, engine compartment, steerable front wheel assemblies and drive train are of any suitable construction and therefore are neither shown in detail in the drawings nor further described.

Figure 2:
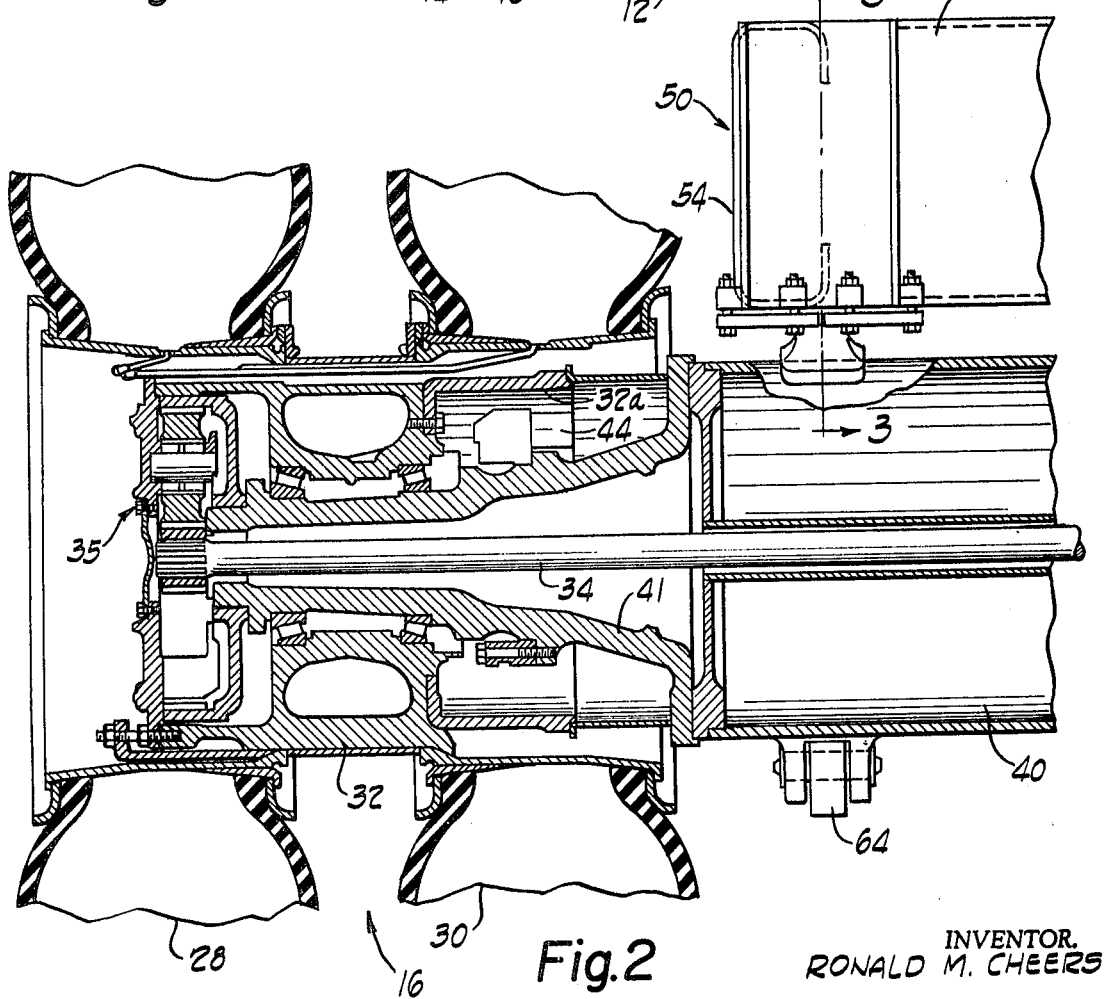
FIG. 2 is a fragmentary vertical cross-sectional view of a rear axle assembly and a portion of a frame of the vehicle shown in FIG. 1.

The rear wheel assemblies 16, 18 are identical and accordingly only the wheel assembly 16 is described in detail in its relation to the frame and drive train. Referring to FIG. 2, the assembly 16 includes ground engaging dirigible tires 28, 30 which are attached to a rotatable hub 32.

The hub 32 is drivingly connected to an axle 34 through a planetary gear reduction generally indicated at 35. The axle 34 is driven from the vehicle engine through a propellor shaft and a differential mechanism (FIG. 1) surrounded by a differential case 38.

An axle housing 40 extends between a differential case 38 and the hub 32. The hub 32 is rotatably supported on a projecting hub support 41 of the axle housing 40 by suitable bearings. The hub 32 defines a brake drum 32a while the hub support 41 carries a brake device 44 for engaging the brake drum to brake rotation of the hub and tires. The brake construction is conventional and therefore not shown in detail.

Each rear wheel assembly is connected to an adjacent portion of the vehicle frame 20 by a suspension system 50. The systems 50 are identical and accordingly only the suspension system associated with the wheel assembly 16 is described in detail. The suspension system 50 includes a link or radius arm 52 extending between the frame 20 and the axle housing 40 and a suspension spring unit 54 between the axle housing 40 and the frame 20.

The radius arm 52 permits vertical movement of the wheel assembly relative to the frame but prevents longitudinal movement of the axle housing along the frame when the brakes are applied. A bearing 58 (FIG. 1) connects one end of the arm to the frame 20 forwardly of the wheel assembly 16. The opposite end of the arm is connected to the lower side of the axle housing 40 by a bearing 64. The radius arm enables the wheel assembly 16 to "swing" about the bearing 58 when the wheel assembly encounters rough terrain. The radius arm transmits braking forces from the axle housing 40 to the frame when the brakes are applied.

Figure 3:
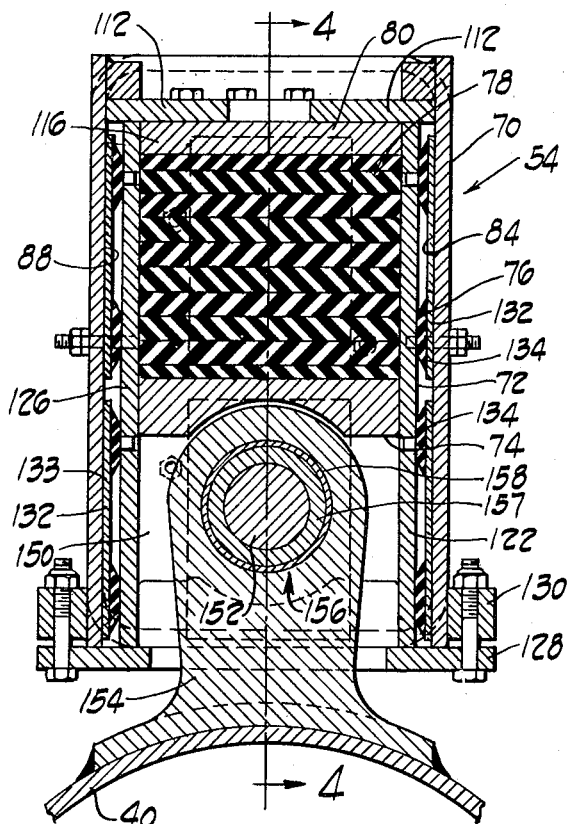
FIG. 3 is a cross sectional view seen from the plane indicated by the line 3—3 of FIG. 2.
Figure 4:
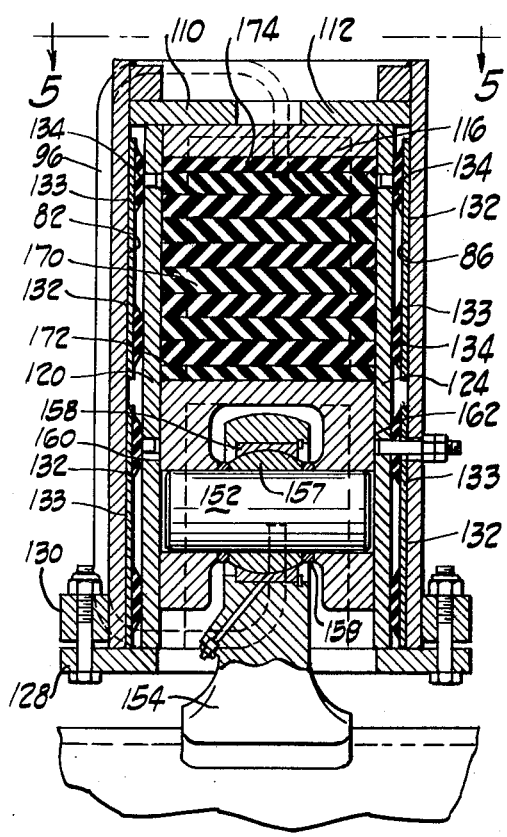
FIG. 4 is a cross sectional view as seen from the plane indicated by the line 4—4 in FIG. 3; and, FIG. 5 is a plan view seen from the plane indicated by the line 5—5 in FIG. 4.
Figure 5:
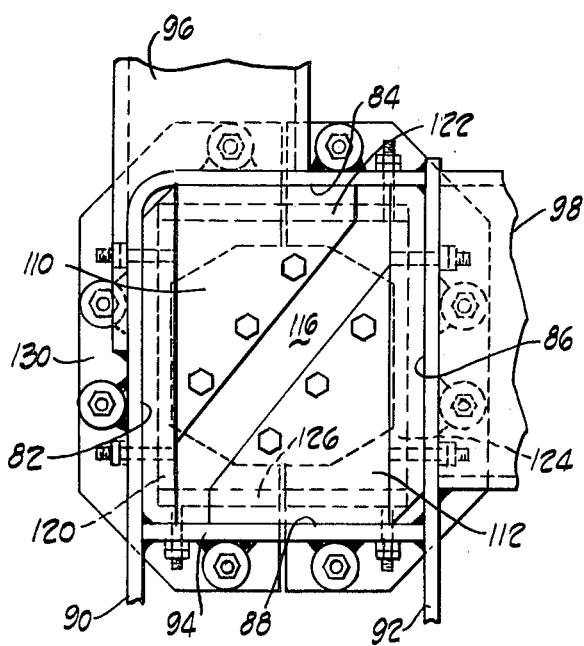

Referring now to FIGS. 3–5 the spring unit 54 includes a housing 70, a sleeve structure 72 supported in the housing 70 and a piston member 74. The piston 74 is connected to the axle housing 40 and extends into the housing 70 and sleeve 72. Elastomeric springs 76, 78 are disposed in the spring unit for cushioning and resiliently resisting relative movement between the piston, sleeve structure and housing.

The housing 70 is tubular, extends generally vertically and has a rectangular cross sectional shape. The tubular housing defines an end wall structure 80 and sidewalls 82, 84, 86 and 88. In the illustrated construction, the housing 70 is formed from frame members of the truck. The sidewalls 82, 84, 86 are formed by longitudinally extending frame plates 90, 92 while the sidewall 88 is formed by a plate 94 which extends laterally between the frame plates 90, 92.

The frame plates 90, 92 extend longitudinally along the vehicle from the housing 70. Another longitudinal frame member 96 is welded to the plate 90 at the housing 70 and extends oppositely from the frame plates 90, 92. A lateral or cross-frame member 98 is attached to the plate 92 at the housing 70.

The end wall 80 is defined by retainer members 110, 112 which are attached to the sidewalls of the housing, and a pressure plate 116 which is carried by the retainers. The pressure plate extends downwardly into the sleeve structure 72.

The sleeve structure 72 includes four plate-like sleeve members 120, 122, 124 and 126 each of which extends parallel to an adjacent sidewall of the housing. The sleeve members are confined between the end wall 90 and a clamp member 128 positioned at the lower end of the housing. The clamp member 128 is preferably bolted to a bottom flange 130 extending around the lower end of the housing 70.

The elastomeric springs 76 are formed by resiliently compressible sleeve spring members 132 interposed between each sleeve member and the adjacent housing sidewall. Each sleeve spring member is formed by a metal backing plate 133 and a plurality of elastomeric elements 134 fixed to the plate 133.

The plate 133 engages the associated housing sidewall and the spring elements 134 project from the backing plate 133 to the associated sleeve plate.

Each sleeve spring member 132 is held assembled to its associated sleeve member by studs 135 which are threaded to the sleeve member and freely extend through openings in the spring member 132 and the housing sidewall, respectively. Threaded ends of the studs 135 extend through the housing sidewalls and receive lock nuts 140 to maintain the sleeve members in desired positions in the housing.

The openings in the spring member 132 and housing walls are of larger diameter than the studs 135 so that each sleeve member is capable of limited movement toward and away from the adjacent housing sidewall against the bias of the sleeve spring member. Each sleeve member is thus supported for movement independently of the motion of the other sleeve members.

The piston member 74 includes a piston body 150 disposed in the sleeve structure 72. The piston body 150 supports a wrist pin 152 which is connected to the axle housing by a piston rod 154. The piston rod 154 is fixed to the axle housing and universally connected to the wrist pin 152 by a spherical bearing 156. The bearing 156 is formed by a ball 157 surrounding the wrist pin, a ball cup 158 and retainer rings 159 for retaining the ball and cup assembled.

The universal connection of the piston rod to the wrist pin minimizes any tendency of the piston body 150 to cock in the sleeve structure 72 as the wheel assembly moves relative to the frame. This eliminates the application of large unit pressure forces to the sleeve structure or sleeve springs by the piston member which would occur if the piston member is cocked in the sleeve.

The piston body 150 has a rectangular cross-sectional shape when viewed in plan and includes lateral sidewalls 160, 162 extending from the head of the piston to form a piston skirt. The sidewalls support the ends of the wrist pin 152. Piston sidewalls 164, 166 preferably face longitudinally of the vehicle, and are relatively short as compared to the vertical extent of the sidewalls 161, 162.

The spring 78 is formed by a stack of elastomeric spring pads 170 which are confined between the piston body 150, the sleeve structure 72 and the housing end wall 80. Spring pads 172, 174 are located at opposite ends of the stack of springs. The pads 172, 174 bear against the piston body 150 and the pressure plate 116, respectively, and are constructed to prevent extrusion of the elastomeric spring material of the spring 78 under pressure.

When the vehicle 10 is at rest, the weight of the frame, body, etc. supported by the rear wheel assemblies 16, 18 is transmitted from the frame to the axle housings and tires through the spring units of the suspension. Accordingly, the spring 78 of each rear spring unit is initially compressed.

When the vehicle is moving and the wheel assembly 16 passes over a bump, that wheel assembly tends to rotate about the wheel assembly 18 so that the wheel assembly 16 is elevated with respect to the frame and moves slightly in a lateral direction relative to the frame as it is elevated. Lateral movement of the wheel assembly 16 is due to foreshortening of the axle as one end elevates relative to the frame.

When this occurs, the wheel reaction force transmitted from the axle housing 40 to the frame 20 has a vertical component and a horizontal component acting along a line of action extending laterally relative to the frame. The vertical force results in the piston 74 further compressing the spring 78. The spring 78 resiliently resists upward motion of the piston relative to the housing 70. Hence, the spring 78 cushions shock loads which would otherwise be transmitted to the frame while producing a reaction force for smoothly retarding upward motion of the wheel assembly.

The lateral component of the force is transmitted by the piston to the housing through the sleeve member 124 and the sleeve spring members 132 which are interposed between the sleeve member 124 and the housing wall 86. As the sleeve member 124 moves towards its associated housing wall, the sleeve spring is substantially uniformly compressed so that a lateral reaction force against lateral movement of the piston smoothly retards such motion of the piston and lateral shock loads are cushioned. The compressive force supplied by the sleeve member to the sleeve spring is substantially uniform over the surface of the sleeve member since the universal connection between the piston and piston rod minimizes cocking of the piston.

When the wheel assembly 16 encounters a depression, the piston is moved laterally against the sleeve member 120. This compresses its sleeve springs 132 and cushions lateral forces applied between the piston and the housing wall 82. When this motion of the wheel 16 occurs the spring 78 is relaxed somewhat since the piston moves downwardly relative to the housing.

While a single embodiment has been illustrated and described herein in considerable detail, the invention is not to be considered limited to the precise construction disclosed and various modifications, adaptations and uses of the invention may occur to those skilled in the art. It is intended to cover hereby all such modifications, adaptations and uses which come within the scope of the appended claims.

I claim:
1. In a suspension for connecting a vehicle frame assembly to a vehicle wheel assembly:
   a. a suspension housing member connected to one of said assemblies, said housing member having an end wall and a sidewall;
   b. a suspension piston member connected to the other assembly and extending into said housing member;
   c. a resiliently compressible spring member between said piston member and said end wall;
   d. a sleeve surrounding said piston and at least a portion of said spring;
   e. said piston movable relative to said sleeve toward and away from said end wall and movable with said sleeve toward and away from said sidewall; and,
   f. a second resiliently compressible sleeve spring between said sleeve and said sidewall, said sleeve and sleeve spring transmitting forces between said piston and housing sidewall.

2. A suspension as claimed in claim 1 wherein said resiliently compressible spring member comprises a plurality of elastomeric members.

3. A suspension as claimed in claim 1 wherein said piston is connected to said other assembly by a universal connector whereby cocking of said piston in said housing and sleeve is minimized.

3. A suspension as claimed in claim 3 wherein said universal connection comprises a wrist pin carried by said piston and a spherical bearing element between said wrist pin and said other assembly.

5. A suspension as claimed in claim 1 wherein said sleeve spring comprises at least a plurality of elastomeric spring elements.

6. A suspension as claimed in claim 1 wherein said sleeve comprises a plurality of plate members each supported for movement toward and away from an adjacent portion of said housing wall independently of said other sleeve plate members.

7. A suspension as claimed in claim 6 wherein said sleeve spring comprises a plurality of sleeve spring members, at least one sleeve spring member interposed between each plate member and an adjacent housing wall portion.

8. A suspension as claimed in claim 7 and further including connecting structure for supporting said sleeve plates and sleeve springs for movement toward and away from said housing wall.

9. A vehicle suspension spring system for supporting a vehicle frame assembly on an axle housing assembly and cushioning force components acting between said axle housing assembly and frame assembly in vertical and transverse planes comprising:
   a. a housing supported by one of said assemblies, said housing defining an end wall, a first pair of side walls extending in planes transverse to the longitudinal centerline of the vehicle and a second pair of side walls extending in planes parallel to said longitudinal centerline of said vehicle;
   b. a piston member supported by said other assembly and extending into said housing, said piston member having side walls extending parallel to said first and second pairs of housing side walls;
   c. first spring means between said piston and said end wall;
   d. second spring means between said piston and said side walls; and,
   e. universal joint means between said piston member and said other assembly for minimizing cocking of said piston with respect to said housing and said first and second spring means.

10. A system as claimed in claim 9 and further comprising first and second pairs of plate members, each plate member extending parallel to a respective one of said housing side walls and engaging a respective one of said piston side walls.

11. A vehicle suspension spring system for supporting a vehicle frame assembly on an axle housing assembly and cushioning force components acting between said axle housing assembly and frame assembly in vertical and transverse planes comprising:
   a. a housing defining an end wall and at least a side wall supported by one of said assemblies;
   b. a piston member supported by said other assembly and extending into said housing;
   c. first spring means between said piston and said end wall;
   d. second spring means between said piston and said side wall;
   e. universal joint means between said piston member and said other assembly for minimizing cocking of said piston with respect to said housing and said first and second spring means; and,
   f. sleeve structure interposed between said piston and said second spring meanS, said sleeve structure comprising a plurality of sleeve members individually movable toward and away from an adjacent housing side wall portion.

12. A system as claimed in claim 11, wherein said first and second spring means comprise elastomeric spring members.

13. A system as claimed in claim 10, and further including means for preventing movement of said plate members axially relative to said housing.

* * * * *